United States Patent [19]

Tomisawa

[11] Patent Number: 5,095,743
[45] Date of Patent: * Mar. 17, 1992

[54] METHOD AND APPARATUS FOR DETECTING DETERIORATION OF SUCKED AIR FLOW QUANTITY-DETECTING DEVICE OF ENGINE

[75] Inventor: Naoki Tomisawa, Isesaki, Japan

[73] Assignee: Japan Electronic Control Systems Co., Ltd., Isesaki, Japan

[*] Notice: The portion of the term of this patent subsequent to May 14, 2008 has been disclaimed.

[21] Appl. No.: 540,616

[22] Filed: Jun. 20, 1990

[30] Foreign Application Priority Data

Jun. 20, 1989 [JP] Japan .................. 1-155693

[51] Int. Cl.$^5$ .............................. G01M 15/00
[52] U.S. Cl. ................................. 73/118.1
[58] Field of Search ............. 73/3, 118.1, 118.2; 340/635, 653; 364/507, 550, 551

[56] References Cited

U.S. PATENT DOCUMENTS 4,594,987  6/1986  Wataya et al. .............. 73/118.2
4,836,016  6/1989  Nakano et al. .............. 73/118.1
4,930,079  5/1990  Kondo ......................... 73/118.1

FOREIGN PATENT DOCUMENTS 60-240840  11/1985  Japan .

Primary Examiner—Robert Raevis
Attorney, Agent, or Firm—Foley & Lardner

[57] ABSTRACT

Sucked air flow quantities are preliminarily alloted and stored for respective areas of predetermined ranges of the driving state of an engine, and every time a new sucked air flow quantity is detected, the stored value is renewed based on the previously stored value and the newly detected value. In the method and apparatus for detecting deterioration of a sucked air flow quantity-detecting device of an engine according to the present invention, the engine driving state is detected and the stored value of the sucked air flow quantity in the corresponding area is retrieved, the retrieved stored value is compared with the sucked air flow quantity actually detected by the detecting device, and deterioration is judged when the difference therebetween is larger than a predetermined value.

4 Claims, 2 Drawing Sheets

METHOD AND APPARATUS FOR DETECTING DETERIORATION OF SUCKED AIR FLOW QUANTITY-DETECTING DEVICE OF ENGINE

BACKGROUND OF THE INVENTION (1) Field of the Invention

The present invention relates to a method and apparatus for detecting deterioration of a sucked air flow quantity-detecting device used in an electronically controlled fuel injection system of an internal combustion engine.

(2) Description of the Related Art

As an example of a conventional electronically controlled fuel injection system, attention is directed to the system mentioned in Japanese Unexamined Patent Publication No. 60-240840.

Namely, a flow quantity Q of air sucked into an engine is detected based on a voltage signal emitted from a sucked air flow quantity-detecting device such as a flap type flow meter or hot-wire type flow meter, and in a control unit, a basic fuel injection quantity $Tp = K \cdot Q/N$, where K is a constant is calculated from this sucked air flow quantity Q and an engine revolution number N calculated from an ignition signal to an ignition coil or a crank angle signal from a crank angle sensor.

Then, this basic fuel injection quantity is corrected by various correction coefficients COEF corresponding to the cooling water temperature and the like and a voltage correction component Ts corresponding to the battery voltage and the final fuel injection quantity $Ti = Tp \cdot COEF + Ts$ is thus calculated.

A driving pulse signal having a pulse width corresponding to the above-mentioned fuel injection quantity Ti is emitted at a synchronous with the revolution of the engine to drive and open a fuel injection valve and effect injection of fuel.

In the conventional system, during idle driving of the engine, for example, when an idle switch is turned on, an upper limit level I of the sucked air flow quantity Q, which is larger by $\Delta Q1$ than the sucked air flow quantity Q for idle driving and cannot be reached in the idle state, is set, and if the sucked air flow quantity Q exceeds this upper limit level I, it is presumed that a disorder has taken place. When the idle switch is turned off, in the driving region where the engine is not in the idle state, a lower limit level II of the sucked air flow quantity Q, which is smaller by $\Delta Q2$ than the sucked air flow quantity Q for idle driving and below which the sucked air flow quantity Q does not decrease even in the idle state, is set, and if the sucked air flow quantity Q is lower than this lower limit level II, it is presumed that a disorder has taken place in the sucked air flow quantity-detecting device.

In this conventional disorder-detecting method, however, although an absolute disorder of the sucked air flow quantity-detecting device can be detected, an unexpected deterioration which has not reached an absolute trouble condition is a variation included within the ranges of $\Delta Q1$ and $\Delta Q2$ and hence, cannot be detected. This deterioration has serious influences on the exhaust gas-purging performance of a vehicle and it is difficult to maintain good exhaust gas-purging performance of a vehicle for a long time.

Of course, it is considered that an unexpected deterioration will be detected by setting smaller values for $\Delta Q1$ and $\Delta Q2$. However, according to this method, even an inherent dispersion of the sucked air flow quantity-detecting device, a change of the atmospheric pressure irrelevant to the sucked air flow quantity-detecting device, or contamination or clogging of the suction system is erroneously judged as a deterioration condition.

SUMMARY OF THE INVENTION

It is a primary object of the present invention to solve the foregoing problems and provide a method and apparatus for detecting deterioration of a sucked air flow quantity-detecting device, in which deterioration of the sucked air flow quantity-detecting device can be detected while avoiding an erroneous judgement of a unexpected deterioration condition.

In accordance with the present invention, the foregoing object can be attained by a method for detecting deterioration of a sucked air flow quantity-detecting device of an engine which comprises the following steps (a) through (d):

(a) detecting the driving state of the engine;

(b) retrieving a sucked air flow quantity from rewritable storage means in which sucked air flow quantities are stored for respective areas of predetermined ranges of the driving state of the engine, based on the engine driving state detected at the engine driving state-detecting step;

(c) comparing the value of the sucked air flow quantity detected by the sucked air flow quantity-detecting device with the retrieved value of the stored sucked air flow quantity and judging unexpected deterioration of the sucked air flow quantity-detecting device when the difference is larger than a predetermined value; and (d) renewing the stored value for each area of the engine driving state based on the stored value of the sucked air flow quantity and the newly detected value.

Furthermore, in accordance with the present invention, there is provided an apparatus for detecting deterioration of a sucked air flow quantity-detecting device of an engine, which comprises the following stages (e) through (i):

(e) an engine driving state-detecting unit for detecting the driving state of the engine;

(f) a rewritable storage unit in which sucked air flow quantities are stored for respective areas of predetermined ranges of the driving state of the engine;

(g) a retrieving unit for retrieving a sucked air flow quantity from the storage unit, based on the engine driving state detected by the engine driving state-detecting unit;

(h) a comparing and judging unit for comparing a sucked air flow quantity detected by a sucked air flow quantity-detecting device with the stored value of the sucked air flow quantity retrieved by the retrieving unit and judging unexpected deterioration when the difference is larger than a predetermined value; and (i) a renewing unit for renewing the stored value of the storage unit for each area of the engine driving state based on the stored value of the sucked air flow quantity and the newly detected value.

It is preferred that the detecting unit (e) be constructed so that the engine revolution number and the opening degree of a throttle valve be detected as parameters of the engine driving state.

It also is preferred that the renewing unit (i) be constructed so that the stored value Qo is renewed based on the detected value Q of the sucked air flow quantity according to the following equation:

$$Q_o \leftarrow Q_o + (Q - Q_o)/M$$

wherein Qo on the right side is the precedent stored value, Qo on the left side is the renewed stored value, Q represents the detected value, and M is a weighting constant.

In the above-mentioned structure, sucked air flow quantities alloted to respective areas of the engine driving state are stored, and every time a sucked air flow quantity is newly detected, the stored value is renewed based on the stored value and the newly detected value.

The engine driving state is detected and the sucked air flow quantity of the area corresponding to the detected engine driving state is retrieved, and the retrieved stored value is compared with the detected value of the sucked air flow quantity and when the difference is larger than a predetermined value, it is judged that unexpected deterioration occurs.

By the above-mentioned structure, when unexpected deterioration of the sucked air flow quantity-detecting means takes place, this is detected and it becomes possible to exchange parts promptly just in time and prevent degradation of the exhaust gas-purging performance of the vehicle.

An especially improved effect is attained when the engine revolution number and the opening degree of the throttle valve are detected as factors of the engine driving state.

Furthermore, since in the renewal of the sucked air flow quantity, a new stored value is set by using a weighting constant, influences of noises can be avoided.

The characteristic structure of the present invention and the function attained by this structure will now be described in detail with reference to one embodiment illustrated in the accompanying drawings.

DETAILED DESCRIPTION OF THE PREFERRED EMBODIMENT

Figure 1:
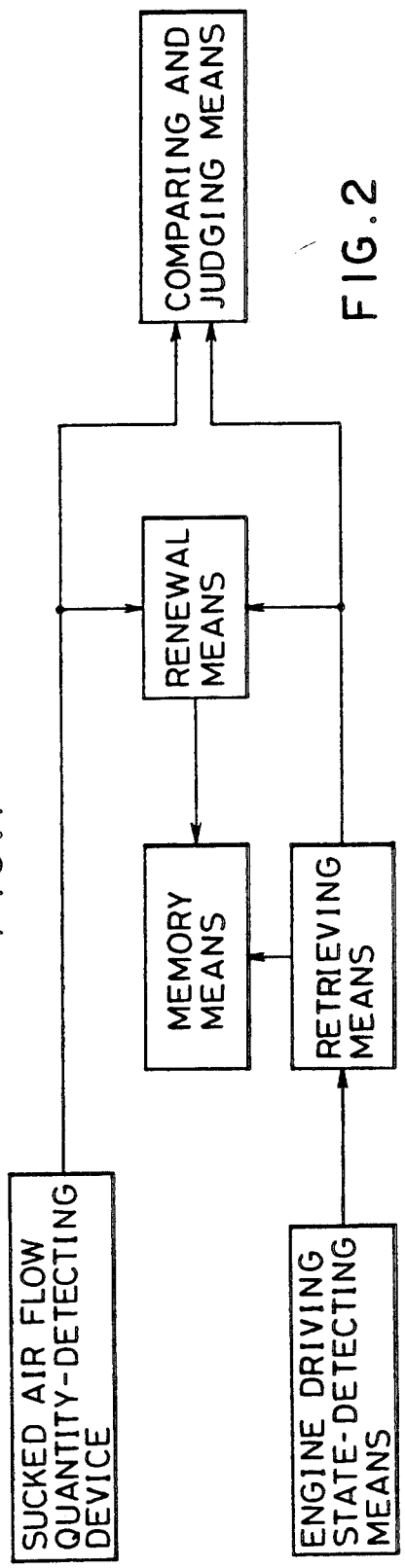
FIG. 1 is a functional block diagram illustrating the structure of the present invention.
Figure 2:
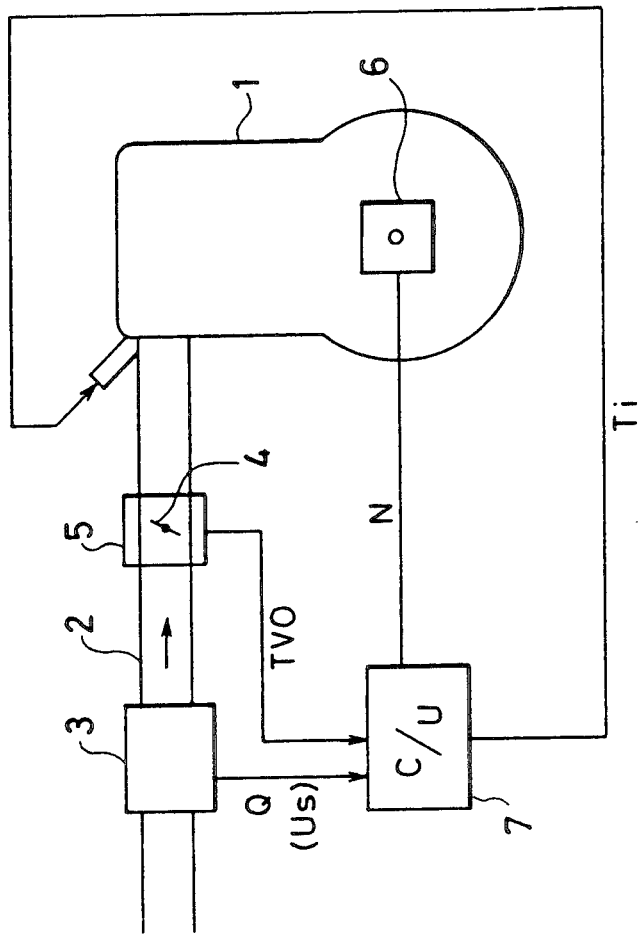
FIG. 2 is a system diagram illustrating one embodiment of the present invention.
Figure 3:
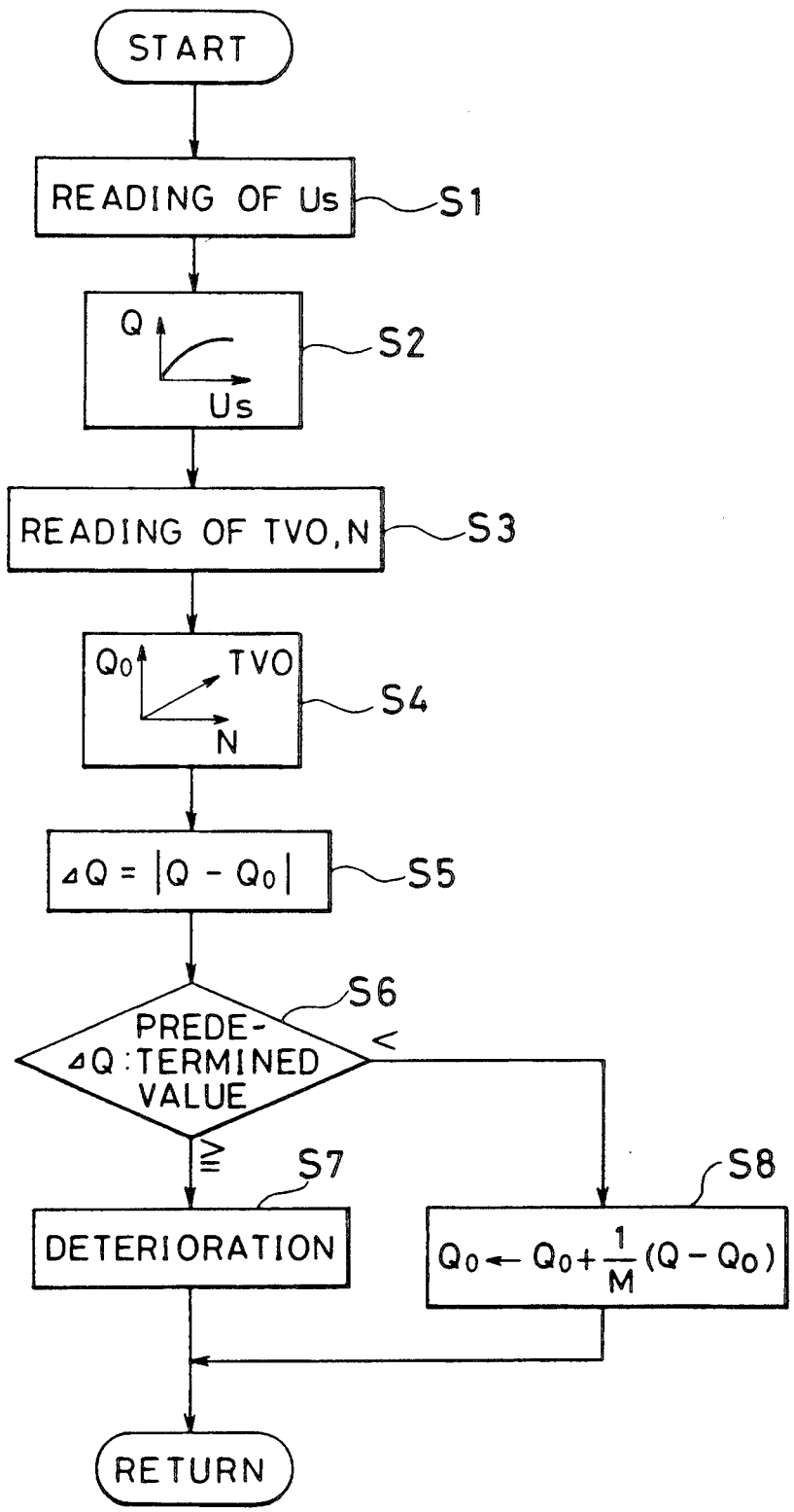
FIG. 3 is a flow chart showing the contents of the control process.

The outline of the present invention is as shown in FIG. 1, and one embodiment is illustrated in FIGS. 2 and 3.

The system of the present embodiment will now be described with reference to FIG. 2.

On the upstream side of a suction path 2 of an engine 1, there is disposed a hot-wire type sucked air flow quantity-detecting device (hereinafter referred to as "air flow meter") 3 generating a voltage Us corresponding to the sucked air flow quantity Q. On the downstream side of the suction path 2, there is disposed a throttle valve 4 to which a throttle sensor 5 for detecting the opening degree of the throttle valve 4 is attached. Furthermore, an engine revolution number sensor 6 for detecting the engine revolution number N as the engine revolution speed, such as a crank angle sensor, is disposed in the engine 1.

The sucked air flow quantity Q, the opening degree TVO of the throttle valve and the engine revolution number N are input to a control unit 7. The routine shown in FIG. 3 is executed in the control unit 7 at every predetermined time period to detect deterioration of the air flow meter 3.

The routine shown in FIG. 3 will now be described.

At step 1 (expressed as S1 in the drawings; subsequent steps are similarly expressed), the output voltage Us of the air flow meter 3 is received, and at step 2, the output voltage Us is converted to the sucked air flow quantity by retrieval from a preliminarily prepared map.

At step 3, the opening degree TVO of the throttle valve detected by the throttle sensor 5 and the engine revolution number N detected by the engine revolution number sensor 6 are received.

This step 3 corresponds to the engine driving state-detecting means.

At step 4, the sucked air flow quantity Qo corresponding to the present driving state is retrieved from a map in a RAM as the rewritable storage means, in which sucked air flow quantities Qo of respective areas of the engine driving state, stored by the engine revolution number N and the opening degree TVO of the throttle valve, are preliminarily stored.

This step 4 corresponds to the retrieving means.

At step 5, the absolute value ΔQ of the difference between the detected value Q of the sucked air flow quantity obtained at step 2 and the stored value Qo retrieved at step 4 is calculated.

The obtained value ΔQ is compared with a predetermined value at step 6, and when the obtained value is equal to or larger than the predetermined value, deterioration of the air flow meter 3 is judged at step 7 and the routine is ended.

When deterioration is judged, the driver is informed of deterioration, for example, by lighting a warning lamp.

These steps 5 through 7 correspond to the comparing and judging means.

If the above-mentioned difference ΔQ of the sucked air flow quantity is smaller than the predetermined value in the comparison of step 6, the routine goes into step 8, and the difference between the sucked air flow quantity Q determined at step 2 and the sucked air flow quantity Qo is added at a predetermined ratio to the sucked air flow quantity Qo obtained at step 4 according to the following equation and the sucked air flow quantity Qo stored in the map is renewed by the new sucked air flow quantity Qo obtained, and this routine is ended:

$$Q_o \leftarrow Q_o + (Q - Q_o)/M$$

wherein M represents a weighting constant of at least 1.

By always renewing the stored value Qo based on the newest detected value Q and comparing the detected value Q with the new stored value Qo in the above-mentioned manner, unexpected deterioration of the air flow meter caused by trouble with a capacitor and adhesion of an organic substance to the hot wire (platinum wire) can be detected.

In the foregoing embodiment, the engine driving number N and the opening degree TVO of the throttle valve are used for determining the driving state of the engine, but there can be adopted a method in which the change of the sucked air pressure is detected by a pressure sensor disposed downstream of the throttle valve in the suction path and the driving state of the engine is determined from the pressure of sucked air and the engine revolution number.

As is apparent from the foregoing description, according to the present invention, when deterioration of the air flow meter abruptly takes place, this deterioration is detected and an exchange of parts can be performed promptly, and degradation of the exhaust gas-purging performance of a vehicle can be prevented. This is an effect attained by the present invention.

I claim:

1. A method for detecting deterioration of a sucked air flow quantity-detecting device of an engine, which comprises the steps of:

detecting a driving state of said engine;

retrieving a stored sucked air flow quantity from a rewritable storage means in which sucked air flow quantities are stored for respective areas of predetermined ranges of said driving state of said engine, based on said driving state of said engine detected at said engine-driving state-detecting step;

comparing a detected value of a sucked air flow quantity detected by said sucked air flow quantity-detecting device with said stored sucked air flow quantity retrieved in said retrieving step and judging unexpected deterioration of said sucked air flow quantity-detecting device when a difference therebetween is larger than a predetermined value; and renewing a stored value for each area of said driving state of said engine based on a previously stored value of said sucked air flow quantity stored in said storage means and a newly detected value of said sucked air flow quantity detected by said sucked air flow quantity-detecting device.

2. An apparatus for detecting deterioration of a sucked air flow quantity-detecting device of an engine, which comprises:

engine driving state-detecting means for detecting a driving state of said engine;

rewritable storage means in which sucked air flow quantities are stored for respective areas of predetermined ranges of said driving sate of said engine;

retrieving means for retrieving a stored sucked air flow quantity from said storage means, based on said engine driving state detected by said engine driving state-detecting means;

comparing and judging means for comparing a sucked air flow quantity detected by said sucked air flow quantity-detecting device with said stored sucked air flow quantity retrieved by said retrieving means and judging unexpected deterioration when a difference therebetween is larger than a predetermined value; and renewing means for renewing a stored value in said storage means for each area of said driving state of said engine based on a previously stored value of said sucked air flow quantity and a newly detected value of said sucked air flow quantity detected by said sucked air flow quantity-detecting device.

3. An apparatus for detecting deterioration of a sucked air flow quantity-detecting device of an engine according to claim 2, wherein said engine driving state-detecting means detects engine revolution speed and opening degree of a throttle valve as parameters of said engine driving state.

4. An apparatus for detecting deterioration of a sucked air flow quantity-detecting device of an engine according to claim 2, wherein said renewing means renews a stored value Qo based on a detected value Q of said sucked air flow quantity according to the following equation:

$$Q_o \leftarrow Q_o + (Q = Q_o)/M$$

wherein Qo on the right side is a precedent stored value, Qo on the left side is a renewed stored value, Q represents a detected value, and M is a weighting constant.

* * * * *